(12) United States Patent
Payne

(10) Patent No.: US 9,188,467 B1
(45) Date of Patent: Nov. 17, 2015

(54) VISUAL SIGHT FLEXIBLE GAS FLOW INDICATOR

(71) Applicant: Marisela Payne, Baytown, TX (US)

(72) Inventor: Marisela Payne, Baytown, TX (US)

( * ) Notice: Subject to any disclaimer, the term of this patent is extended or adjusted under 35 U.S.C. 154(b) by 160 days.

(21) Appl. No.: 14/086,949

(22) Filed: Nov. 21, 2013

(51) Int. Cl.
*G01F 1/05* (2006.01)

(52) U.S. Cl.
CPC .......................... *G01F 1/05* (2013.01)

(58) Field of Classification Search
CPC F16K 37/0058; F16K 37/0075; G01F 15/061
USPC ............. 73/170.01, 170.05, 170.07; 116/112, 116/174, 264, 270, 273; 138/104
See application file for complete search history.

(56) References Cited

U.S. PATENT DOCUMENTS

| | | | |
|---|---|---|---|
| 2,617,298 A * | 11/1952 | Grinley | ....................... 73/170.07 |
| 3,857,277 A | 12/1974 | Moore | |
| 4,286,463 A * | 9/1981 | Cole | ........................... 73/170.07 |
| 5,065,691 A | 11/1991 | Brighton | |
| 6,526,907 B1 | 3/2003 | Donehue | |
| 6,889,797 B2 * | 5/2005 | Cowgill et al. | ................ 181/178 |
| 7,310,047 B2 | 12/2007 | Al-Wehebi | |
| 7,401,572 B2 | 7/2008 | Donehue | |
| 8,061,389 B2 | 11/2011 | McEwan | |

* cited by examiner

*Primary Examiner* — Daniel S Larkin
*Assistant Examiner* — Irving A Campbell
(74) *Attorney, Agent, or Firm* — Kenneth A. Roddy

(57) ABSTRACT

A visual sight flexible gas flow indicator has a truncated conical sleeve formed of flexible water repellent material tapered along its length from a larger diameter throat end to a smaller diameter exit end defining an interior. A threaded fitting secured to the throat end has an interior in fluid communication with the sleeve interior and is configured to be threadedly engaged in fluid flow communication with a conduit or bleeder valve of a vessel or piping system through which a gas to be monitored flows. The sleeve hangs flaccidly in a generally vertical position when no gas is flowing through the fitting and sleeve from the conduit or valve. Upon gas flowing through the fitting and sleeve from the conduit or valve, the sleeve becomes fully extended in a generally horizontal position to provide an external visual indication, from a distance, of gas flow and location of the leaking gas.

6 Claims, 1 Drawing Sheet

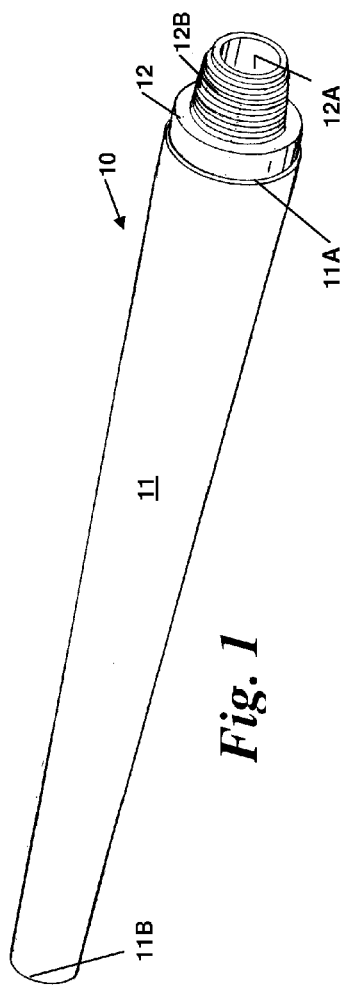
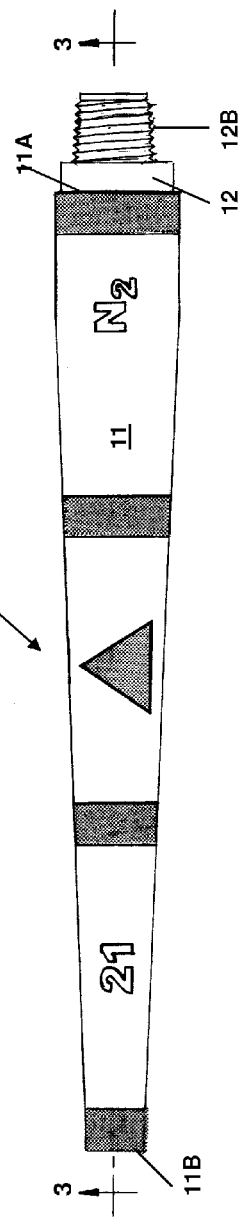
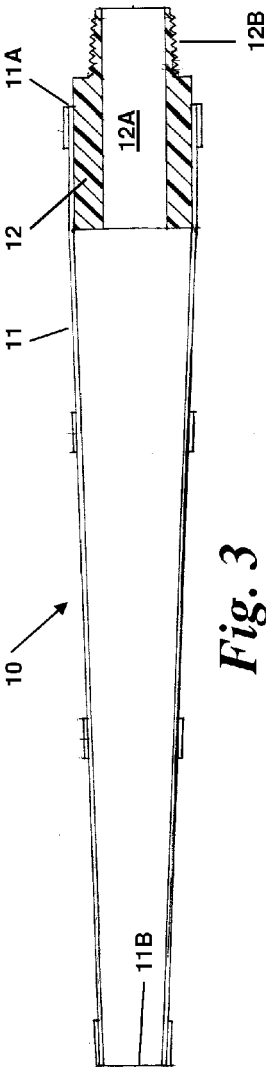
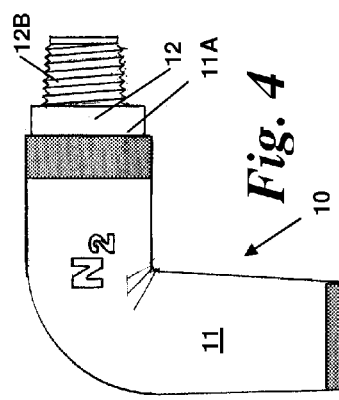

VISUAL SIGHT FLEXIBLE GAS FLOW INDICATOR

BACKGROUND OF THE INVENTION

1. Field of the Invention

This invention relates generally to sight flow indicators for indicating fluid flow through or from a conduit and, more particularly, to a visual sight flexible gas flow indicator having a flexible truncated conical sleeve that connects to a gas conduit or bleeder valve and normally hangs flaccidly in a generally vertical position and becomes fully extended in a generally horizontal position to provide an external visual indication of gas flow or leakage easily seen a distance from the location of the flowing or leaking gas, and reduce the risks of inhalation exposure or asphyxia.

2. Background Art

Typically in industrial plants, such as refineries and petrochemical plants, a vessel, tank or piping system which previously contained hydrocarbons, must be periodically shut down, cleaned, and made safe by "purging" or "inerting" before resuming operations.

"Purging" displaces or flushes out hydrocarbons by introducing substances such as an inert gas, steam or water. Purging a hydrocarbon-filled system with air can create an explosive atmosphere. Using air as a purging gas significantly increases the risk of an explosion. Typically, air forced through a system containing a flammable or combustible liquid residue creates a mist cloud of airborne liquid droplets. Flammable liquid droplets evaporate quickly, and can produce an explosive atmosphere. If there is enough liquid residue, the explosive conditions may persist for a very long time—longer than workers may be willing to wait before beginning their work.

"Inerting" displaces or dilutes the hydrocarbons in the vessel, tank or piping system with an inert (non-flammable and non-reactive) gas such as nitrogen or carbon dioxide, or a compatible inert liquid such as water. The atmosphere must remain non-explosive while workers perform their work. During the work, all ignition sources must be controlled so that they cannot trigger a fire or explosion.

However, the inerting and/or purging operations themselves may create hazards to workers by displacing the oxygen in the environment. If a worker must enter a tank that has been inerted/purged, the proper procedures and protective equipment must be used.

Nitrogen is an inert gas that is colorless, odorless, and tasteless, and because it displaces oxygen, is typically used for purging and inerting, and as a "sweep through" to remove oxygen from vessels, piping and equipment prior to their recommission, and to bring hydrocarbons and other chemicals to a safe "LEL" level (Lower Explosive Limit). The Lower Explosive Limit (LEL) is defined as: The lowest concentration (percentage) of a gas or a vapor in air capable of producing a flash of fire in presence of an ignition source (arc, flame, heat). At a concentration in air below the LEL, there is not enough fuel to continue an explosion. Concentrations lower than the LEL are "too lean" to explode but may still burn violently. as a sweep through to remove oxygen from vessels, piping and equipment prior to its commission Although workers may be equipped with LEL meters, many LEL meters will not read properly when oxygen levels are less than 10 percent. Without enough oxygen, these meters can give an incorrect low reading even if flammable vapors and gases still remain.

Nitrogen can be very deadly. It can act as an asphyxiant and choke a person to death in less than 40 seconds. Each year many accidents and deaths involving nitrogen occur. Nitrogen displaces oxygen from the air whenever it comes in contact with it. If a continuous flow of nitrogen is released into air, the oxygen level in the air depletes very fast and can choke a person who is breathing this nitrogen-rich air. Thus, a worker who is carrying out a vessel purging and/or inerting operation or a follow-up inspection in a typical petrochemical plant (where the vessel most likely was purged with nitrogen to rid it of explosive vapors), or somebody who is even standing near or in the vicinity of a vessel that has nitrogen purging on, is at risk.

There are a variety of sight indicators known in the art. Typically, these sight indicators are devices that are installed on a pipe and have a window to provide a visual means of verifying liquid flow for direction and approximate rate, and to observe the color and clarity of process fluids passing through the device. One of the problems with these types of sight indicators is that it requires a person to be relatively close to the device in order to observe flow within the pipe on which it is mounted.

Moore, U.S. Pat. No. 3,857,277, discloses a flow indicator comprising a housing having a chamber therein and including inlet and outlet openings communicating with opposite ends of the chamber. A flexible flap hingedly connected to the housing for flexure within the chamber in response to fluid flow through the chamber is visible through a transparent observation port to provide direct indication of fluid flow. A magnet carried by the flap actuates at least one magnetically responsive switch mounted in the housing and adapted for connection in an external circuit to alter the condition of the circuit in response to at least one predetermined flow condition. The flap also functions as a check valve to prevent retrograde fluid flow through the housing.

Brighton, U.S. Pat. No. 5,065,691, discloses a fluid flow indicator for use with light transmitting conduits having end fittings which include a bore. The flow indicator includes a base defined by a coiled wire closely received within the fitting bore and an axially extending indicator support which extends from the base into the conduit includes a rotatable flag whose rotation can be exteriorly observed or sensed as fluid flow occurs. The coiled wire base includes an abutment engaging with fitting structure for axially positioning the indicator relative to the fitting and conduit.

Donehue, U.S. Pat. Nos. 6,526,907 and 7,401,572, disclose a flow indicating device including a tube, a turbine wheel, and a cylinder. The tube defines a flow path. The turbine wheel is mounted in the tube for rotation alongside an inside wall of the tube. The turbine wheel has a plurality of turbine blades. The cylinder is mounted outside the tube for rotation alongside an outside wall of the tube. The cylinder is magnetically coupled to the turbine wheel through the sidewall of the tube so that rotation of the turbine wheel causes rotation of the cylinder. A visually observable pattern is provided on an outside surface of the cylinder so that rotation of the cylinder can be visually ascertained. The device is easy to install and provides an indication of flow within the pipe which is highly visible, easy to read, and viewable from any location around the pipe.

Al-Wehebi, U.S. Pat. No. 7,310,047, discloses a hazardous gases and wind direction sensor that includes a housing having a hazardous gas sensor. The gas sensor sends an output signal to a transmitter at a predetermined frequency upon detecting a hazardous gas. Wind detection is provided by eight LEDs aligned with eight corresponding photocells disposed in the housing, where each photocell represents a topographical direction and is adapted to provide an output signal associated with a particular wind direction at a predetermined frequency. A disk is coupled to a rotatable shaft in the housing and positioned between the LEDs and photocells. The shaft is coupled to a wind direction indicator such as a windsock. The disk has a slot sized to allow light to pass from one of the LEDs to its corresponding photocell, which sends an output signal to enable a switching circuit in the transmitter. The switching circuit enables the output signal at a predetermined frequency to be transmitted to a receiver. The system detects harmful gases in the environment and the direction of the wind, and providing an early-warning system to alert personnel in the vicinity of such dangerous conditions so that they can retreat away from the path of the oncoming harmful gases.

McEwan, U.S. Pat. No. 8,061,389, discloses an apparatus and methods for duct leakage control wherein a sealing element having a "windsock" is introduced into the duct and is automatically drawn or otherwise guided to the locality of a leak; the element being caused, by reason of a pressure differential attributable to the leak, to move into and stem or seal the leak. The sealing element may comprise a plurality of individual members of differing buoyancy, each capable of being carried along at a predetermined level in the duct by the flow of fluid therein. The sealing element may carry a tagging device which can be used to assist in locating the leakage site.

SUMMARY OF THE INVENTION

The present invention overcomes the aforementioned problems and is distinguished over the prior art in general, and these patents in particular by a visual sight flexible gas flow indicator for providing an external visual indication, from a distance, whether gas may be flowing or leaking from a conduit or bleeder valve of a vessel or piping system, and the location of the flowing or leaking gas. The visual sight flexible gas flow indicator has a truncated conical sleeve formed of a flexible water repellent material tapered along its length from a larger diameter throat end to a smaller diameter exit end defining an interior. A threaded fitting is secured to the throat end and has an interior passageway in fluid communication with the sleeve interior and is configured to be threadedly engaged in fluid flow communication with the conduit or bleeder valve of a vessel or piping system through which a gas to be monitored flows. The flexible sleeve normally hangs flaccidly in a generally vertical position when no gas is flowing through the fitting and the sleeve interior from the conduit or bleeder valve. Upon gas flowing through the fitting and the sleeve interior from the conduit or bleeder valve, the flexible sleeve becomes fully extended in a generally horizontal position to provide an external visual indication, from a distance, of gas flow.

The flexible sleeve may be of a bright color or combinations of colors, may have a reflective material on at least a portion thereof, and may be provided with indicia in the form of lettering, numerals, symbols, and combinations thereof.

One of the significant features and advantages of the present invention is that the visual sight flexible gas flow indicator allows workers or other personnel to easily see, from a distance, where gas may be flowing or leaking, and visually ascertain the location of the flowing or leaking gas at a distance from the gas, thereby reducing the risks of inhalation exposure or asphyxia.

Another feature and advantage of the present visual sight flexible gas flow indicator is that it is easily and quickly installed on a conduit or bleeder valve of a vessel or piping system.

Another feature and advantage of the present visual sight flexible gas flow indicator is that it may be provided in various bright colors, and may include a reflective material on at least a portion thereof, and may be provided with indicia in the form of lettering, numerals, symbols, and combinations thereof.

Another feature and advantage of the present visual sight flexible gas flow indicator is that it may be numbered to correspond with a lock out or tag out accountability system to allow workers to accurately and precisely document the location and status of a purge, an open bleeder valve, and other gas flow or leakage problems and potential hazards.

Another feature and advantage of the present visual sight flexible gas flow indicator is that it may be provided with reflective material on at least a portion thereof, and may be provided with reflective indicia in the form of lettering, numerals, symbols, and combinations thereof, that can clearly be seen in darkened areas by workers using a flashlight.

A further feature and advantage of the present visual sight flexible gas flow indicator is that it allows workers or other personnel to easily see, from a distance, where gas may be flowing or leaking, and visually ascertain the location of the flowing or leaking gas at a distance from the gas, thereby reducing need to climb ladders and stairs and assume dangerous positions, and the risks of injury due to slipping or falling.

A still further feature and advantage of the present visual sight flexible gas flow indicator is that it is simple in construction, inexpensive to manufacture, and rugged and reliable in operation.

Other features and advantages of the invention will become apparent from time to time throughout the specification and claims as hereinafter related.

BRIEF DESCRIPTION OF THE DRAWINGS

FIG. 1 is a perspective view of the visual sight flexible gas flow indicator in accordance with the present invention, shown with the flexible truncated conical sleeve in fully extended generally horizontal position.

FIG. 2 is a side elevation view of the visual sight flexible gas flow indicator in the fully extended position to provide an external visual indication of gas flow therethrough, shown with reflective rings, a symbol, numerals, and lettering on the flexible truncated conical sleeve.

FIG. 3 is a longitudinal cross sectional view of the visual sight flexible gas flow indicator taken along line 3-3 of FIG. 2, shown with the flexible truncated conical sleeve in a fully extended position.

FIG. 4 is a side elevation view of the visual sight flexible gas flow indicator in accordance with the present invention, shown with the flexible truncated conical sleeve in a normally flaccid generally vertical position.

DESCRIPTION OF THE PREFERRED EMBODIMENT

Referring to the drawings by numerals of reference, there is shown in FIGS. 1, 2, 3, and 4, a preferred visual sight flexible gas flow indicator 10. The visual sight flexible gas flow indicator 10 has a truncated conical sleeve 11 formed of a soft flexible water repellent fabric or synthetic material, or a blend of the two. If the fabric is not naturally immune to water absorption, it may be coated or treated to be water repellent.

The visual sight flow indicator flexible sleeve 11 tapers along its length from a larger diameter throat end 11A to a smaller diameter trailing end, or exit end 11B. The throat end 11A is secured to a threaded fitting 12 having an interior passageway 12A in fluid communication with the interior of the sleeve 11 of the visual sight flexible gas flow indicator 10. The throat end 11A is firmly secured to the threaded fitting 12 by any suitable retainer means 13, such as glue or epoxy, a clamp, or elastic band.

The threaded fitting 12 is configured to be engaged in fluid flow communication with a conduit or bleeder valve of a vessel or purge piping system through which a gas to be monitored flows. For purposes of example, the threaded fitting 12 is shown to be a straight fitting with external threads 12B at one end, however, it should be understood that the threaded fitting may be an L-shaped fitting, and may be internally threaded, or provided with a raised nut portion or flats for receiving a wrench.

When no gas is flowing through the conduit or bleeder valve, the visual sight flow indicator flexible sleeve 11 normally hangs flaccidly in a generally vertical position, as shown in FIG. 4. When gas is flowing through the conduit or bleeder valve, the gas passes through the fitting 12 and passes through the interior of the visual sight flow indicator sleeve 11 and exits through the exit end 11B causing the sleeve to become fully extended in a generally horizontal position in the manner of a windsock, as shown in FIGS. 1-3, and thereby provide an external visual indication of gas flow.

Thus, the visual sight flexible gas flow indicator 10 allows workers or other personnel to easily see, from a distance, where gas may be flowing or leaking, and visually ascertain the location of the flowing or leaking gas at a distance from the gas, thereby reducing the risks of inhalation exposure or asphyxia.

The visual sight flow indicator sleeve 11 may be provided in various bright colors, such as white, yellow, blue, or orange, to increase visibility, or various combinations of colors. For example, the visual sight flow indicator sleeve 11 may be a bright royal blue color with reflective silver rings, lines, and/or lettering, numerals, symbols, and combinations thereof as shown in FIGS. 2 and 4.

The visual sight flow indicator sleeve 11 may also be numbered to make it easy to implement a lock out or tag out accountability system. Such a system would allow workers to accurately and precisely document the location and status of a purge, an open bleeder valve, and other gas flow or leakage problems and potential hazards.

It should be understood that one or more threaded adapters may be provided with the visual sight flexible gas flow indicator 10 for connecting the threaded fitting 12 in fluid communication with various sizes and types of conduit or bleeder valves of a vessel or purge piping system through which a gas to be monitored flows.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. A visual sight flexible gas flow indicator for providing an external visual indication, from a distance, whether gas may be flowing or leaking from a conduit or bleeder valve of a vessel or piping system, and the location of the flowing or leaking gas, comprising:
    a truncated conical sleeve formed of a flexible water repellent material tapered along its length from a larger diameter throat end to a smaller diameter exit end defining an interior; and
    a threaded fitting secured to said throat end having an interior passageway in fluid communication with said sleeve interior configured to be threadedly engaged in fluid flow communication with a conduit or bleeder valve of a vessel or piping system through which a gas to be monitored flows;
    said flexible sleeve normally hanging flaccidly in a generally vertical position when no gas is flowing through said fitting and said sleeve interior from the conduit or bleeder valve; and
    upon gas flowing through said fitting and said sleeve interior from the conduit or bleeder valve, said flexible sleeve becoming fully extended in a generally horizontal position to provide an external visual indication, from a distance, of gas flow.

2. The visual sight flexible gas flow indicator according to claim 1, wherein
    said flexible sleeve is of a bright color or combinations of colors.

3. The visual sight flexible gas flow indicator according to claim 1, wherein
    at least a portion of said flexible sleeve comprises a reflective material.

4. The visual sight flexible gas flow indicator according to claim 1, wherein
    said flexible sleeve includes indicia selected from the group consisting of lettering, numerals, symbols, and combinations thereof.

5. The visual sight flexible gas flow indicator according to claim 1, wherein
    said flexible sleeve includes reflective indicia selected from the group consisting of rings, lines, bands, lettering, numerals, symbols, and combinations thereof.

6. A method for providing an external visual indication, from a distance, whether gas may be flowing or leaking from a conduit or bleeder valve of a vessel or piping system, and the location of the flowing or leaking gas, comprising the steps of:
    providing a visual sight flexible gas flow indicator having a truncated conical sleeve formed of a flexible water repellent material tapered along its length from a larger diameter throat end to a smaller diameter exit end defining an interior, and a threaded fitting secured to said throat end having an interior passageway in fluid communication with said sleeve interior;
    threadedly engaging said fitting in fluid flow communication with the conduit or bleeder valve of a vessel or piping system through which a gas to be monitored flows; such that
    said flexible sleeve normally hangs flaccidly in a generally vertical position when no gas is flowing through said fitting and said sleeve interior from the conduit or bleeder valve; and
    upon gas flowing through said fitting and said sleeve interior from the conduit or bleeder valve, said flexible sleeve becomes fully extended in a generally horizontal position to provide an external visual indication, from a distance, of gas flow.

* * * * *